US012692882B2

(12) United States Patent
Doran

(10) Patent No.: US 12,692,882 B2
(45) Date of Patent: Jul. 28, 2026

(54) Z-CLIP OR FURRING STRIP WITH ANGLED BASE FOR DEPTH ALIGNMENT

(71) Applicant: Wexford Innovations, LLC, Petaluma, CA (US)

(72) Inventor: Patrick Doran, Petaluma, CA (US)

(73) Assignee: WEXFORD INNOVATIONS, LLC, Petaluma, CA (US)

( * ) Notice: Subject to any disclaimer, the term of this patent is extended or adjusted under 35 U.S.C. 154(b) by 0 days.

(21) Appl. No.: 19/287,187

(22) Filed: Jul. 31, 2025

(65) Prior Publication Data

US 2025/0361894 A1 Nov. 27, 2025

Related U.S. Application Data

(63) Continuation-in-part of application No. 18/783,314, filed on Jul. 24, 2024, which is a continuation of application No. 18/599,939, filed on Mar. 8, 2024, now Pat. No. 12,085,104.

(51) Int. Cl.
*F16B 2/14* (2006.01)
*F16B 5/12* (2006.01)

(52) U.S. Cl.
CPC ............... *F16B 2/14* (2013.01); *F16B 5/123* (2013.01)

(58) Field of Classification Search
CPC ............. F16B 2/14; F16B 5/123; F16B 35/06
USPC ....................... 52/126.1, 551, 553; 248/205.1
See application file for complete search history.

(56) References Cited

U.S. PATENT DOCUMENTS

| | | | | |
|---|---|---|---|---|
| 530,766 A | * | 12/1894 | Gaston | B25B 31/005 |
| | | | | 411/918 |
| 1,614,221 A | * | 1/1927 | Westbrook | F16B 2/14 |
| | | | | 411/538 |
| 2,094,779 A | * | 10/1937 | Donaldson | F16B 2/14 |
| | | | | 29/238 |
| 2,914,817 A | * | 12/1959 | Jackson | E06B 1/52 |
| | | | | 49/505 |
| 4,165,852 A | | 8/1979 | Chervenak | |
| 4,530,482 A | | 7/1985 | Berinson | |
| 4,908,952 A | * | 3/1990 | Joos | E04F 13/14 |
| | | | | 33/526 |
| 5,729,934 A | * | 3/1998 | Ochoa | E04G 21/18 |
| | | | | 33/483 |
| 7,748,182 B2 | | 7/2010 | McGee et al. | |
| 7,784,751 B1 | * | 8/2010 | Bellows | A47B 91/00 |
| | | | | 248/346.11 |

(Continued)

FOREIGN PATENT DOCUMENTS

WO 0039425 A1 7/2000

*Primary Examiner* — Kimberly T Wood
(74) *Attorney, Agent, or Firm* — INNOVATION CAPITAL LAW GROUP, LLP; Vic Lin

(57) ABSTRACT

A furring strip, or other similar element, has a back side that is angled relative to the front face. A wedge is designed to be used with the furring strip, where the wedge has an angle that matches the angle of the back side of the furring strip. Thus, the wedge can be slid under the furring strip at a desired position to angle the furring strip in its use position, while allowing the furring strip to be vertically offset from the wall. The system provided by the furring strip and wedge can quickly and easily set furring strips on a substrate to a vertical reference plane, thus providing an easy fit for a wall panel, or other such applications, to be subsequently attached thereto.

17 Claims, 16 Drawing Sheets

(56)        References Cited

U.S. PATENT DOCUMENTS

| | | | | |
|---|---|---|---|---|
| 7,905,465 | B1 * | 3/2011 | Anwar | F16M 7/00 |
| | | | | 248/673 |
| 8,359,811 | B2 | 1/2013 | Muller | |
| 12,085,104 | B1 * | 9/2024 | Doran | F16B 2/14 |
| 2005/0072894 | A1 | 4/2005 | Grant | |
| 2009/0272055 | A1 | 11/2009 | Griffiths | |
| 2010/0077676 | A1 | 4/2010 | Dobler | |
| 2012/0304573 | A1 * | 12/2012 | Aboukhalil | E04F 19/061 |
| | | | | 52/506.05 |
| 2019/0021524 | A1 | 1/2019 | Yang | |
| 2023/0417062 | A1 | 12/2023 | Giattina et al. | |

* cited by examiner

Z-CLIP OR FURRING STRIP WITH ANGLED BASE FOR DEPTH ALIGNMENT

CROSS-REFERENCE TO RELATED APPLICATIONS

This application is a continuation-in-part of U.S. patent application Ser. No. 18/783,314, filed Jul. 24, 2024, which is a continuation of U.S. Pat. No. 12,085,104, filed Mar. 8, 2024, and issued on Sep. 10, 2024, the contents of each of which are herein incorporated by reference.

BACKGROUND OF THE INVENTION

1. Field of the Invention

Embodiments of the invention relate generally to brackets and mounting systems. More particularly, embodiments of the invention relate to a z-clip bracket or an angled furring strip that can easily adjust its mounted distance vertically from a wall.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Architectural panels are well known in the building trade and are often used to cover existing wall surfaces to create a specific design element or effect.

It is well known to hang architectural panels using panel clips, also commonly referred to as panel "Z" clips, or simply z-clips, which have lower portion for placement against a wall, and an upper portion, extending upward and spaced apart from the wall. In use, a first z-clip can be attached to the wall. A second z-clip can be attached to the back of the panel such that it has an upper portion attached to the back of the panel, and a lower portion extending downward and spaced apart from the back of the panel. The panel is hung attached to the wall by placing the downward-facing, offset portion of the z-clip on the back of the panel into the upward-facing offset portion of the z-clip attached to the wall.

Panel installers need to ensure that all panels will be aligned in the vertical plane so that the face of each panel will be aligned with the face of every other panel. Since the surface of a wall is not typically vertically aligned over the entire surface of the wall, a plurality of flat shims are combined to build out the surface of the wall to a vertical reference, typically at the location of each wall stud where each panel clip is to be located.

Similarly, in other fields, such as backing for tile, siding or the like, furring strips may be used against a wall frame. These furring strips, however, often are out of plane vertically and requiring shimming to ensure a flat outer panel. The furring strips may be constructed of wood, metal, composite materials, hat channel profiles, or rain screen assemblies, for example.

The shims are installed such that the outward-facing surface of each shimmed area is in vertical alignment with the outward-facing surface of every other shimmed area.

The shims are typically secured in place by nails, screws and/or glue, in accordance with the installer's preference.

The process of shimming out the z-clips or furring strips to a vertical reference plane can prove difficult and time consuming. Further, the installer would need a plurality of shims of varying sizes to ensure the z-clips of furring strips confirm to the vertical reference plane.

In view of the foregoing, there is a need for a convenient and easy-to-use system and method of applying z-clips of furring strips to a wall and adjusting their vertical offset from the wall to provide a vertical reference plane.

SUMMARY OF THE INVENTION

Embodiments of the present invention aim to solve the aforementioned problems in conventional mounting systems by providing a z-clip and/or furring strips that can be easily vertically adjusted with respect to the wall on which it is mounted. The design of the system, including an angled wedge combined with a mounting element (such as a z-clip, furring strip, or the like, as discussed below) that has an angled back matching the angle of the wedge, can eliminates the need for multiple shim sizes, accelerates alignment for large-format panels, and reduce skilled labor requirements and onsite customization.

Embodiments of the present invention provide a system for creating a planar mounting surface comprising a furring strip spanning a length, where the furring strip has a front face, a back face, a top side and a bottom side, the back face forming a first angle with respect to the top side, the front face forming a second angle with respect to the top side, and a difference of the first angle and the second angle defining a furring strip back face angle; and a wedge having a wedge back side configured to be positioned against a substrate, with at least a portion of the wedge back side being disposed between the back face of the furring strip and the substrate; and a wedge front side configured to be slidable along the back face of the furring strip, wherein the wedge back side and the wedge front side form a wedge angle to provide a continuously increasing thickness along a length of the wedge, from a tip end toward a distal end thereof.

Embodiments of the present invention provide a system for creating a planar mounting surface comprising a furring strip spanning a length, where the furring strip has a front face, a back face, a top side and a bottom side, the back face forming a first angle with respect to the top side, the front face forming a second angle with respect to the top side, and a difference of the first angle and the second angle defining a furring strip back face angle; and a wedge having a wedge back side configured to be positioned against a substrate, with at least a portion of the wedge back side being disposed between the back face of the furring strip and the substrate; and a wedge front side configured to be slidable along the back face of the furring strip, wherein the wedge back side and the wedge front side form a wedge angle to provide a continuously increasing thickness along a length of the wedge, from a tip end toward a distal end thereof; the back face is continuous and linear about an entirety of the back side; and the wedge angle matches the furring strip back face angle.

Embodiments of the present invention provide a method for creating a planar mounting surface comprising disposing a furring strip, spanning a length, on a substrate, where the furring strip has a front face, a back face, a top side and a bottom side, the back face forming a first angle with respect to the top side, the front face forming a second angle with respect to the top side, and a difference of the first angle and the second angle defining a furring strip back face angle; disposing a portion of a wedge between the furring strip and the substrate, the wedge having a wedge back side positioned against the substrate, the wedge having a wedge front side slidable along the back face of the furring strip to adjust a vertical displacement of the furring strip from the substrate, wherein the wedge back side and the wedge front side form a wedge angle to provide a continuously increasing thickness along a length of the wedge, from a tip end toward a distal end thereof; and adjusting a position of the wedge to align the furring strip to create the planar mounting surface at the front face of the furring strip.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figures 1, 2, 3, 4:
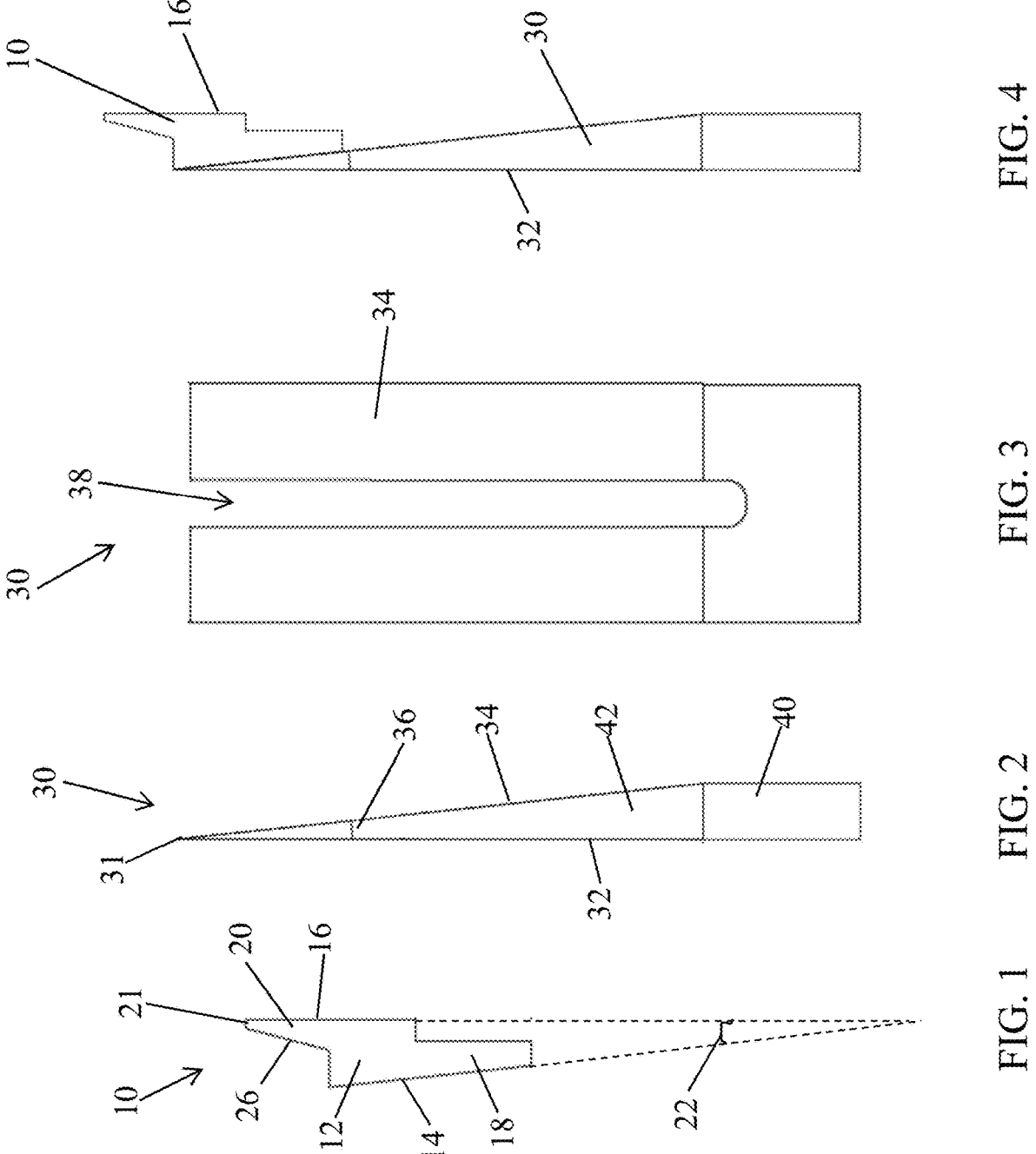
FIG. 1 illustrates a side view of a bracket according to an exemplary embodiment of the present invention.
FIG. 2 illustrates a side view of a wedge usable with the bracket of FIG. 1.
FIG. 3 illustrates a top view of the wedge of FIG. 2.
FIG. 4 illustrates an engagement of the bracket of FIG. 1 with the wedge of FIG. 2.
Figure 7:
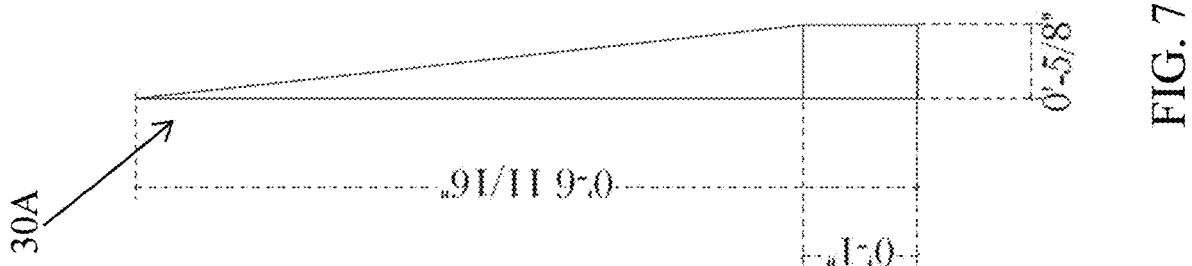
FIG. 7 illustrates a side view of the wedge of FIG. 2, showing another example of measurements of the wedge applied thereto.
Figure 6:
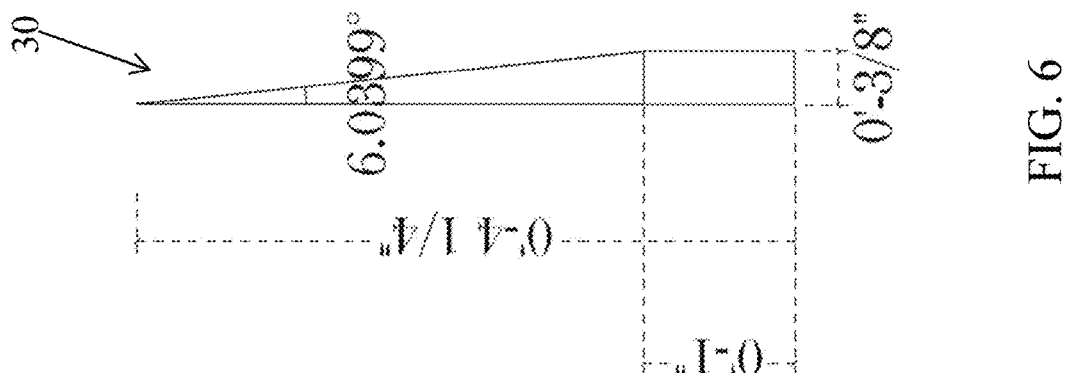
FIG. 6 illustrates a side view of the wedge of FIG. 2, showing one example of measurements of the wedge applied thereto.
Figure 5:
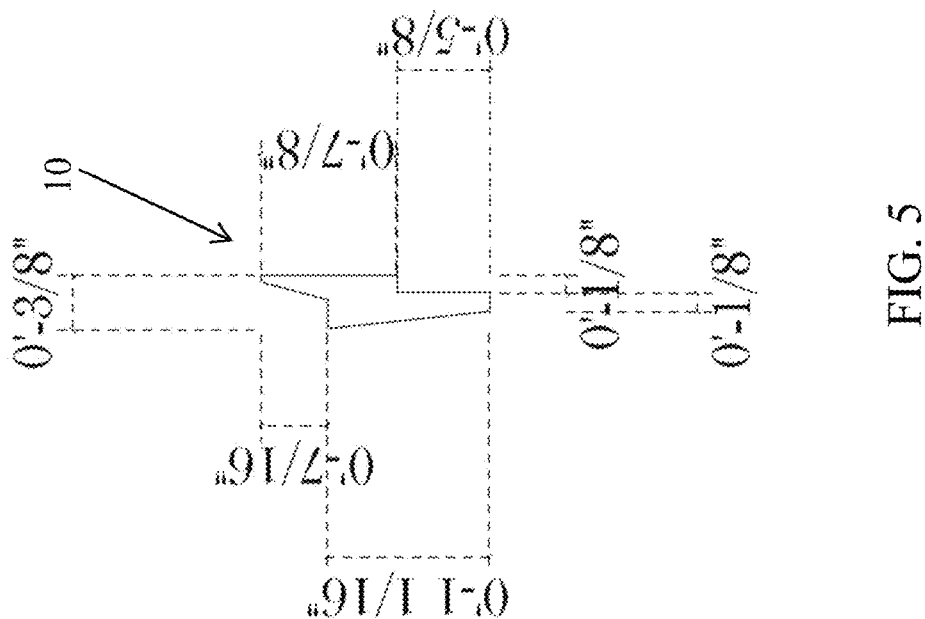
FIG. 5 illustrates a side view of the bracket of FIG. 1, showing one example of measurements of the bracket applied thereto.

The illustrations in the figures may not necessarily be drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a z-clip and/or a furring strip having a back side member that is angled relative to the front face. A wedge is designed to be used with the z-clip or furring strip, where the wedge has an angle that matches the angle of the back side member of the z-clip of the furring strip. Thus, the wedge can be slid under the z-clip or furring strip at a desired position to angle the z-clip or furring strip in its use position, while allowing the z-clip or furring strip to be vertically offset from the wall. The system provided by the z-clip and/or furring strip, and wedge can quickly and easily set z-clips or furring strips on a wall to a vertical reference plane, thus providing an easy fit for a wall panel to be subsequently attached thereto. Further provided are quick offset blocks that can attach to ends of each row of z-clips to provide a means for spanning a string therebetween, thus providing a vertical reference line for aligning z-clips along the vertical reference line.

Referring now to FIG. 1, a bracket 10 (also referred to as a z-clip 10) can include a main body 12 having a back side 14 that faces a wall when in use, as described below. The main body 12 further includes a front side 16, opposite the back side 14. A lower portion 18 extends from the main body 12, where the back side 14 extends uniformly from the main body 12 to the lower portion 18. An upper portion 20 extends upward from the main body 12, where the front side 16 extends uniformly from the main body to the upper portion 20. A back side 26 of the upper portion 20 can be spaced apart from the back side 14 of the main body 12. Typically, the back side 26 of the upper portion 20 is angled so that the upper portion 20 is wider (where width is along the direction from the back side 14 to the front side 16 of the main body) at its lower end (where the upper portion 20 extends from the main body 12) and narrows toward its distal end 21. Such an angle may vary and, in some embodiments, the back side 26 of the upper portion 20 may be parallel to the front side 16.

A mounting hole 24 (see FIG. 14) may be provided through the lower portion 18. The mounting hole may be configured to receive a fastener, as described below, to attach the bracket 10 to the wall.

As can be seen by the dashed lines in FIG. 1, the back side 14 may be angled relative to the front side 16. The angle 22 may be from about 4 to about 10 degrees, typically about 5 to 8 degrees, often about 6 degrees or 7 degrees.

Referring also to FIGS. 2 through 4, a wedge 30 can be provided with a back side 32 and a front side 34, where the front side and back side are angled at an angle 36 to terminate at a tip 31 thereof. In some embodiments, as shown in FIG. 2, for example, the wedge 30 can include a sloped portion 42 and a non-sloped portion 40, where the front side 34 and the back side 32 are parallel at the non-sloped portion 40 and are relatively angled at the sloped portion 42.

The wedge 30 can include a slot 38 formed from the front side 34 to the back side 32. The slot 38 can extend from the tip 31 and extend along the sloped portion 42 and terminate at or slightly into the non-sloped portion 40. When the fastener extends through the hole 24 of the bracket 10, the wedge 30 may be slid under the bracket 10, from a bottom side of thereof, with the hole 24 aligning with the slot 38 of the wedge 30. As shown in FIG. 4, when the front side 34 of the wedge is positioned against the back side 14 of the bracket 10, the front side 16 of the bracket 10 may be substantially parallel with the back side 32 of the wedge. When positioned against the wall, the front side 16 of the bracket 10 may be substantially parallel with the wall. Such a feature is due to the angle 36 of the wedge 30 being matched to the angle 22 of the bracket 10. The wedge 30 may be slid an appropriate amount under the bracket 10, as discussed below, to provide a continuously variable amount of displacement of the bracket 10 from the wall. Unlike shims that are provided in different thicknesses, the wedge can provide a continuously variable displacement.

FIGS. 5 through 8 show exemplary dimensions form the bracket 10, wedge 30 and another embodiment of a wedge 30A. As can be seen, wedge 30 can provide from zero inch to about ¼ inch displacement of the bracket from the wall. If further displacement is needed, wedge 30A may be chosen, where the bracket may be positioned from zero inch to about ½ inch from the wall. As can be seen, due to the wedge 30 and wedge 30A having the same angle (matching angle 22 of bracket 10), the wedge 30A is made longer to as to end at tip 31. In some embodiments, the end of the wedge 30A (adjacent to tip 31) may be removed, so that wedge 30A ends at the dashed line 33. Such a design may be useful where both wedge 30 and wedge 30A are provided, as wedge 30 can provide adjustments from 0 to ⅜ inch, while wedge 30A may provide adjustments from, for example, ¼ inch to ⅝ inch. Tip removal may be especially useful for even thicker wedges, if needed, to shorten their overall length.

In some embodiments, a kit can be provided that includes one or more brackets 10 and a plurality of wedges 30, 30A that can provide mounting of the bracket in a single vertical reference plane. The wedges 30, 30A, as discussed above, can have angle 36 that matches the angle 22 of the bracket 10, where the wedges have different lengths to provide different amounts of maximum vertical displacement (that is, displacement along a horizontal line away from the wall) of the bracket 10 from the surface or wall on which it is mounted. The kit can further include at least two quick offset blocks 70, as discussed below with reference to FIGS. 14 and 15.

Figure 9:
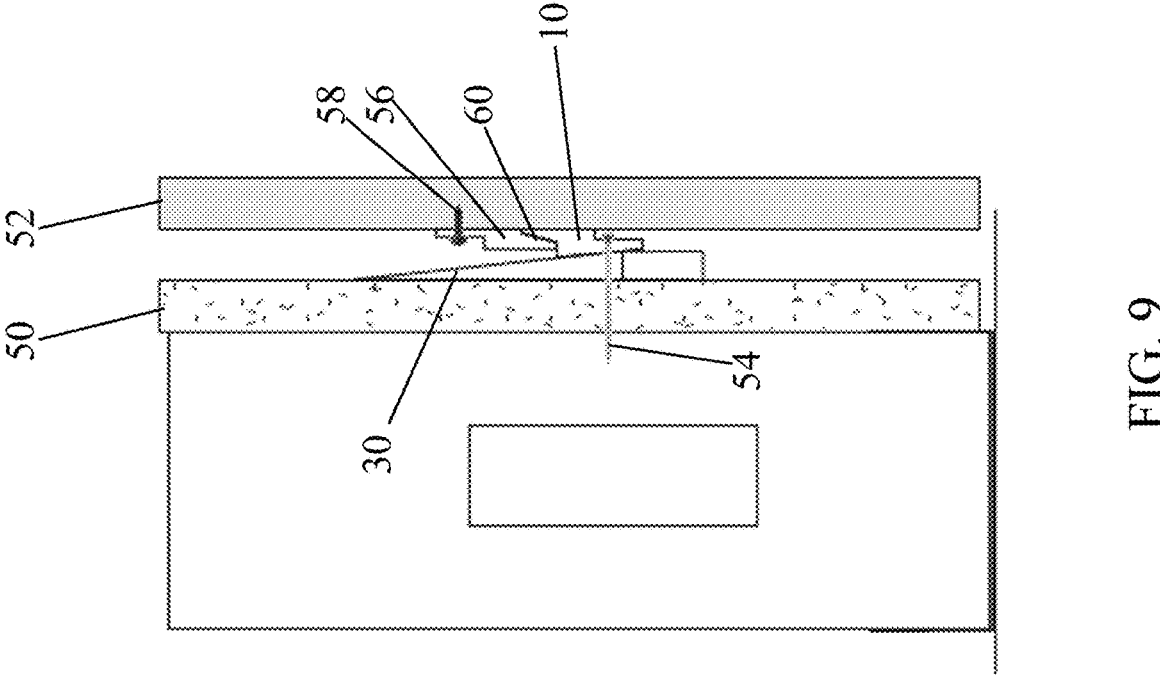
FIG. 9 illustrates the bracket of FIG. 1 and the wedge of FIG. 2 used to hang a hanging structure, according to an exemplary embodiment of the present invention.
Figure 8:
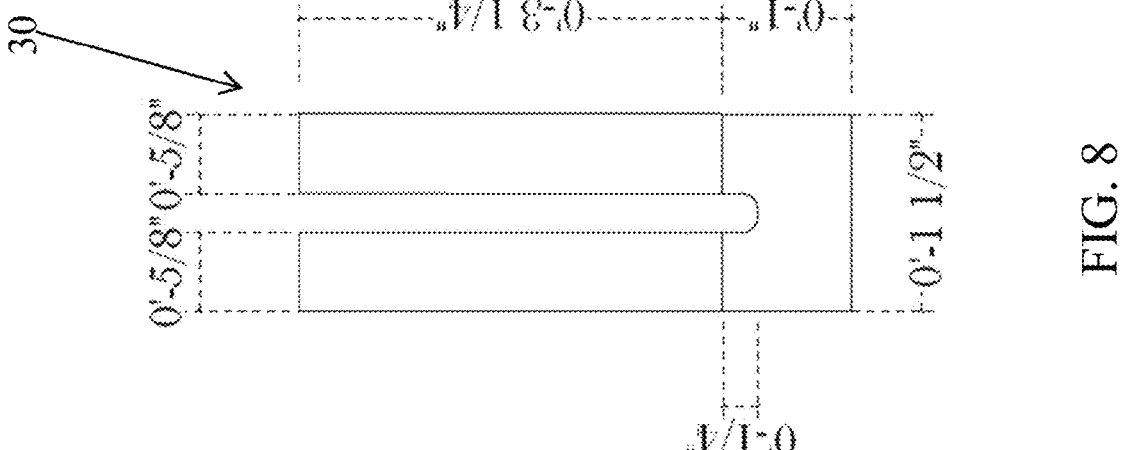
FIG. 8 illustrates a top view of the wedge of FIG. 2, showing one example of measurements of the wedge applied thereto.

Referring now to FIGS. 1, 2 and 9, the bracket 10 is attached to wall 50 with fastener 54. The wedge 30 is positioned between the back side 14 of the bracket 10 and the wall 50 so that the front side 16 of the bracket 10 is substantially parallel to the wall 50. A wall panel 52 can include a z-clip bracket 56 attached thereto with a fastener 58. A lower portion 60 of the z-clip bracket 56 can fit behind the upper portion 20 of bracket 10, as shown in FIG. 9.

Figures 10, 11:
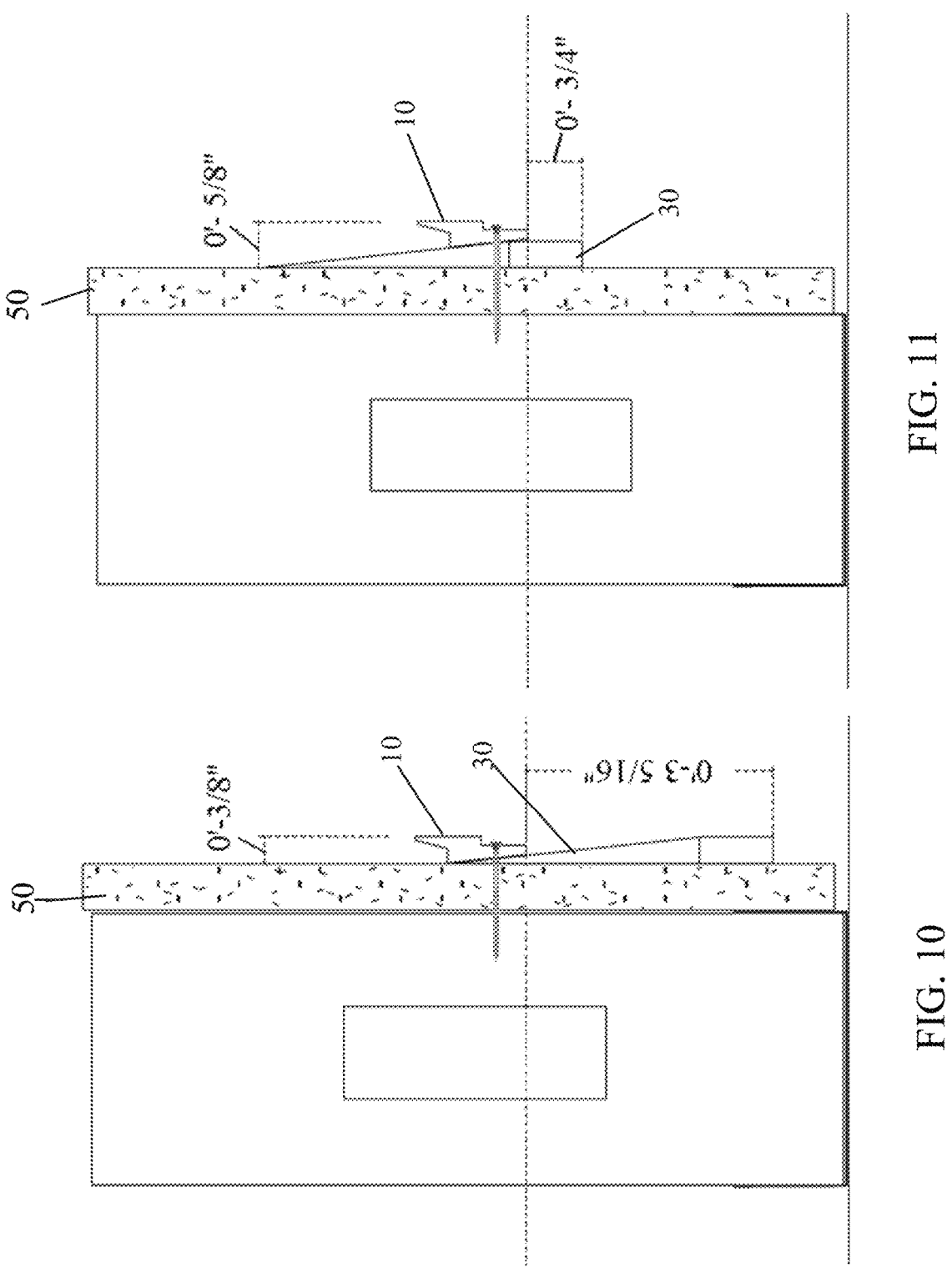
FIG. 10 illustrates the bracket of FIG. 1 and the wedge of FIG. 6 used to provide a minimal or no vertical displacement of the bracket from the wall.
FIG. 11 illustrates the bracket of FIG. 1 and the wedge of FIG. 6 used to provide a maximum vertical displacement of the bracket from the wall.
Figures 12, 13:
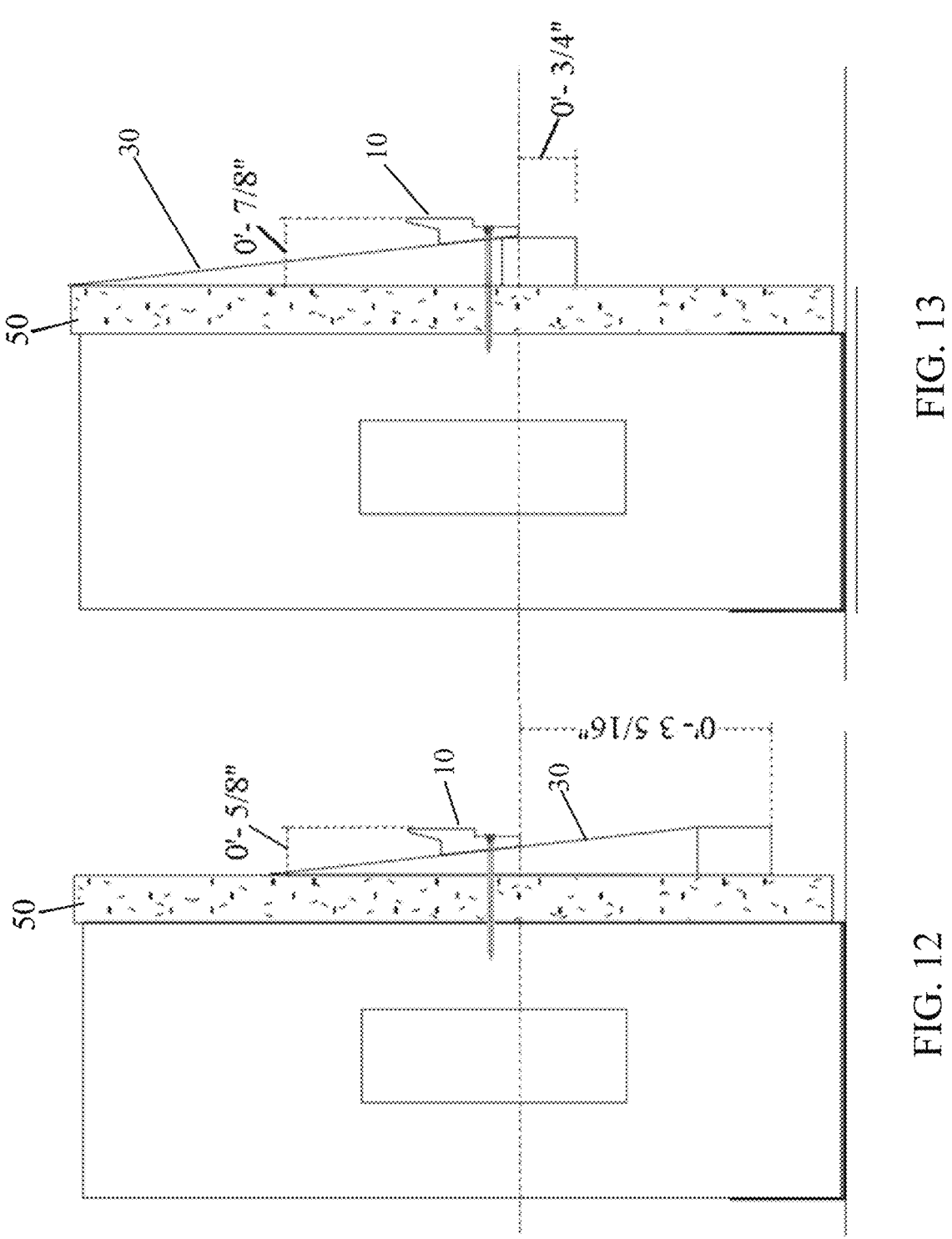
FIG. 12 illustrates the bracket of FIG. 1 and the wedge of FIG. 7 used to provide a minimal or no vertical displacement of the bracket from the wall.
FIG. 13 illustrates the bracket of FIG. 1 and the wedge of FIG. 7 used to provide a maximum vertical displacement of the bracket from the wall.

FIGS. 10 and 11 show how the wedge 30 can be positioned to provide zero vertical displacement (FIG. 10) and a maximum vertical displacement (FIG. 11). Thus, the wedge 30 can move the distal end 21 of the bracket 10 from about ⅜ inch from the wall to about ⅝ inch from the wall. FIGS. 12 and 13 show how the wedge 30A can be positioned to provide zero vertical displacement (not shows), and can further provide a vertical displacement from the end of the range of wedge 30 (FIG. 12) to a maximum vertical displacement (FIG. 13). Thus, the wedge 30A can move the distal end 21 of the bracket 10 from about ⅜ inch from the wall (not shown) to about ⅝ inch from the wall (FIG. 12) and beyond to about ⅞ inch from the wall (FIG. 13). As described above, the vertical displacement is continuously variable, where any distance between zero and the maximum displacement provided by the wedge 30 can be chosen simply by sliding the wedge behind the bracket 10.

Figures 14A, 14B, 14C:
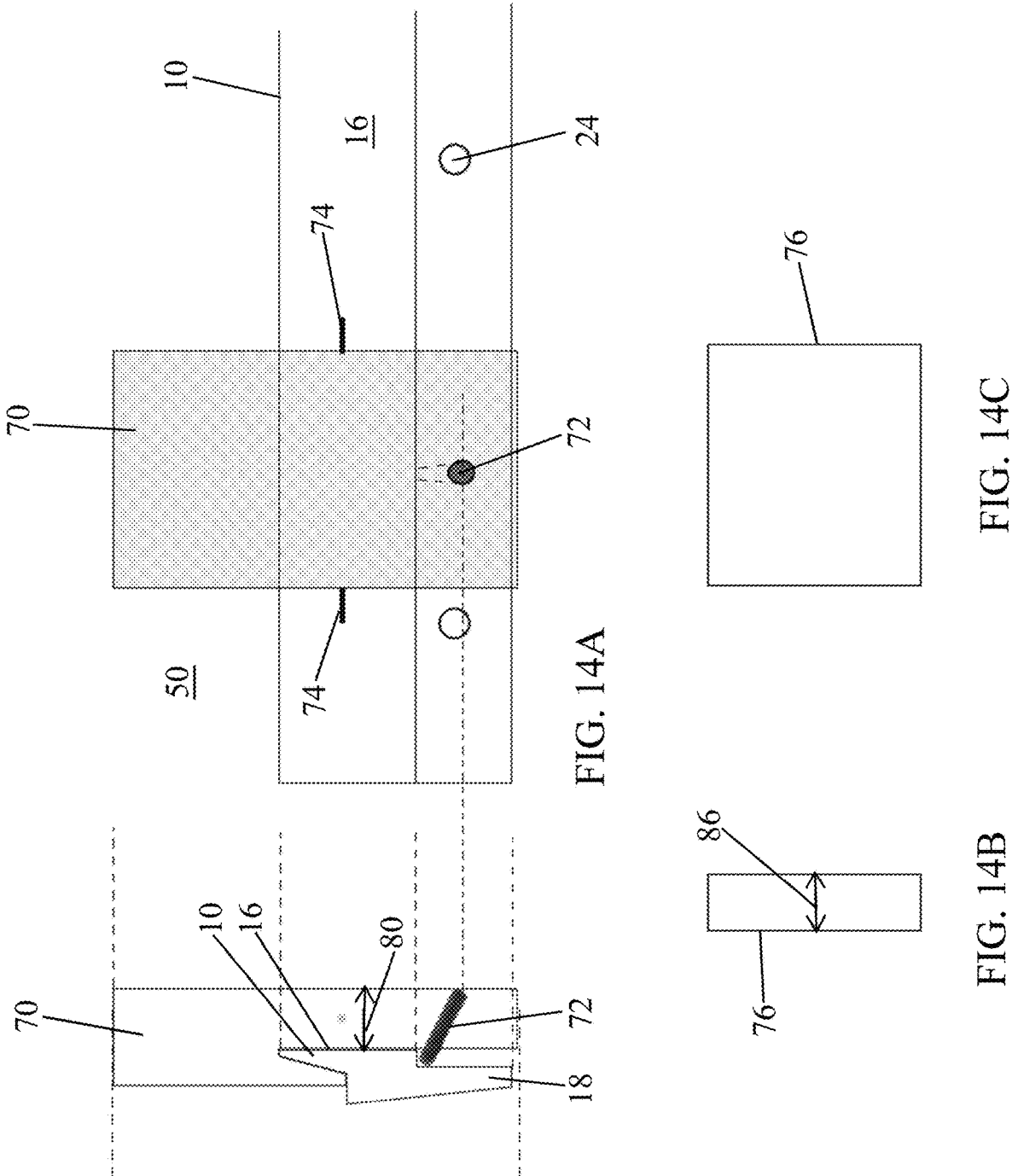
FIG. 14A illustrates a quick offset block for vertically aligning the bracket(s) of FIG. 1 along a wall.
FIG. 14B illustrates a side view of a matching offset block for vertically aligning the bracket(s) of FIG. 1 along a wall.
FIG. 14C illustrates a front view of the matching offset block of FIG. 14B.
Figure 15:
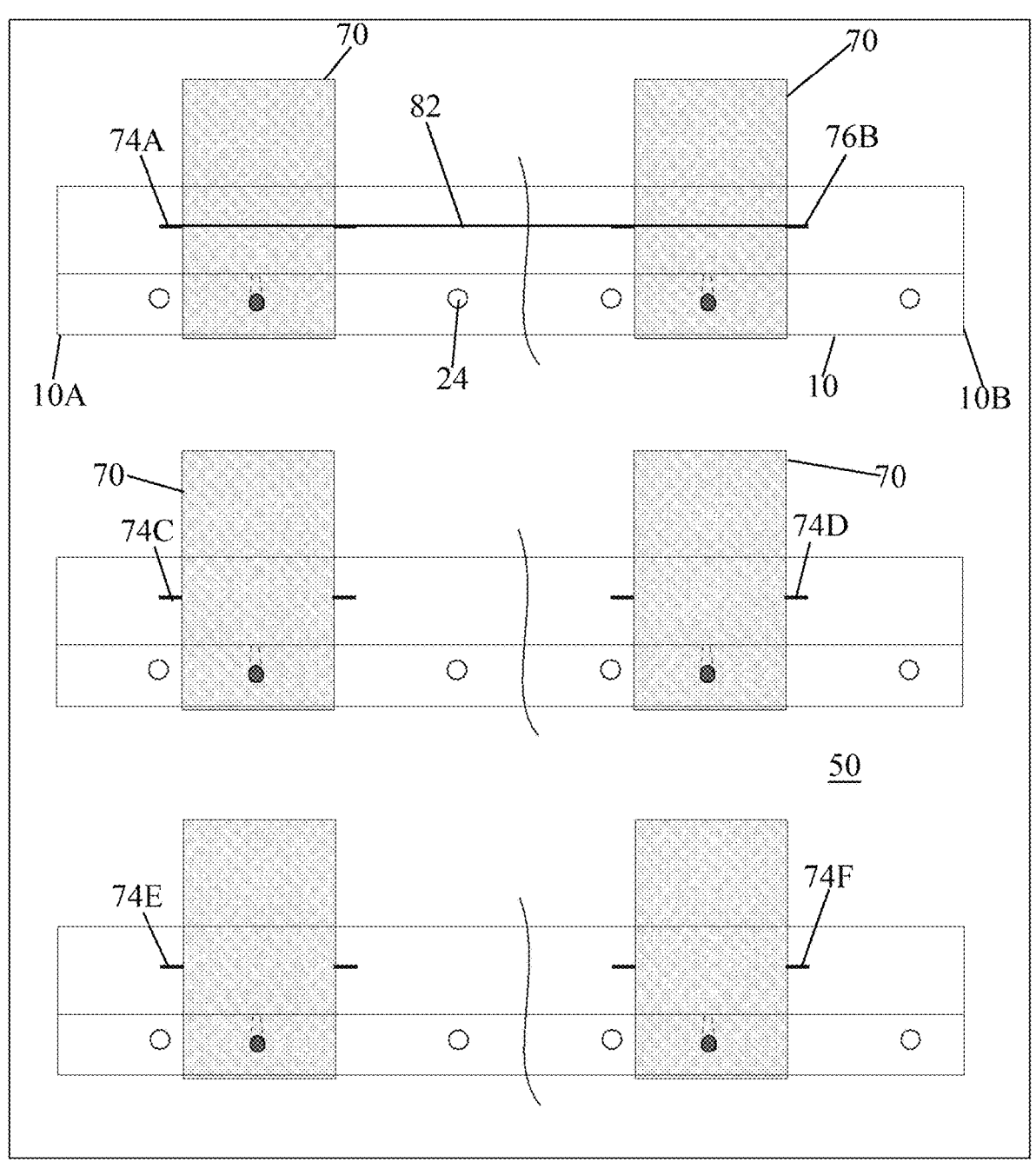
FIG. 15 illustrates a schematic representation of the bracket of FIG. 1 applied to a wall, with the quick offset blocks applied thereto and a string extending from end to end of each row of brackets, according to an exemplary method of the present invention.

Referring now to FIGS. 14A through 15, in some embodiments, a system for mounting items to a wall can include not only the bracket 10 and the wedge 30, as described above, but also a quick offset block 70 and a matching offset block 76 (see FIGS. 14B and 14C). The quick offset block 70 may be configured to attach to the bracket 10, as shown in FIG. 14A, where a front face 84 of the quick offset block 70 is positioned a distance 80 away from the front side 16 of the bracket 10. A block retainer 72 may extend to a position under the main body 12 of the bracket 10 to temporarily secure the quick offset block 70 onto the bracket 10 during use thereof. The quick offset block 70 can include tie arms 74 extending from each side of the quick offset block 70. The tie arms 74 may be positioned at a central region of the front side 16 of the bracket 10 when the quick offset block 70 is positioned on the bracket 10, as shown in FIG. 14.

Figure 16:
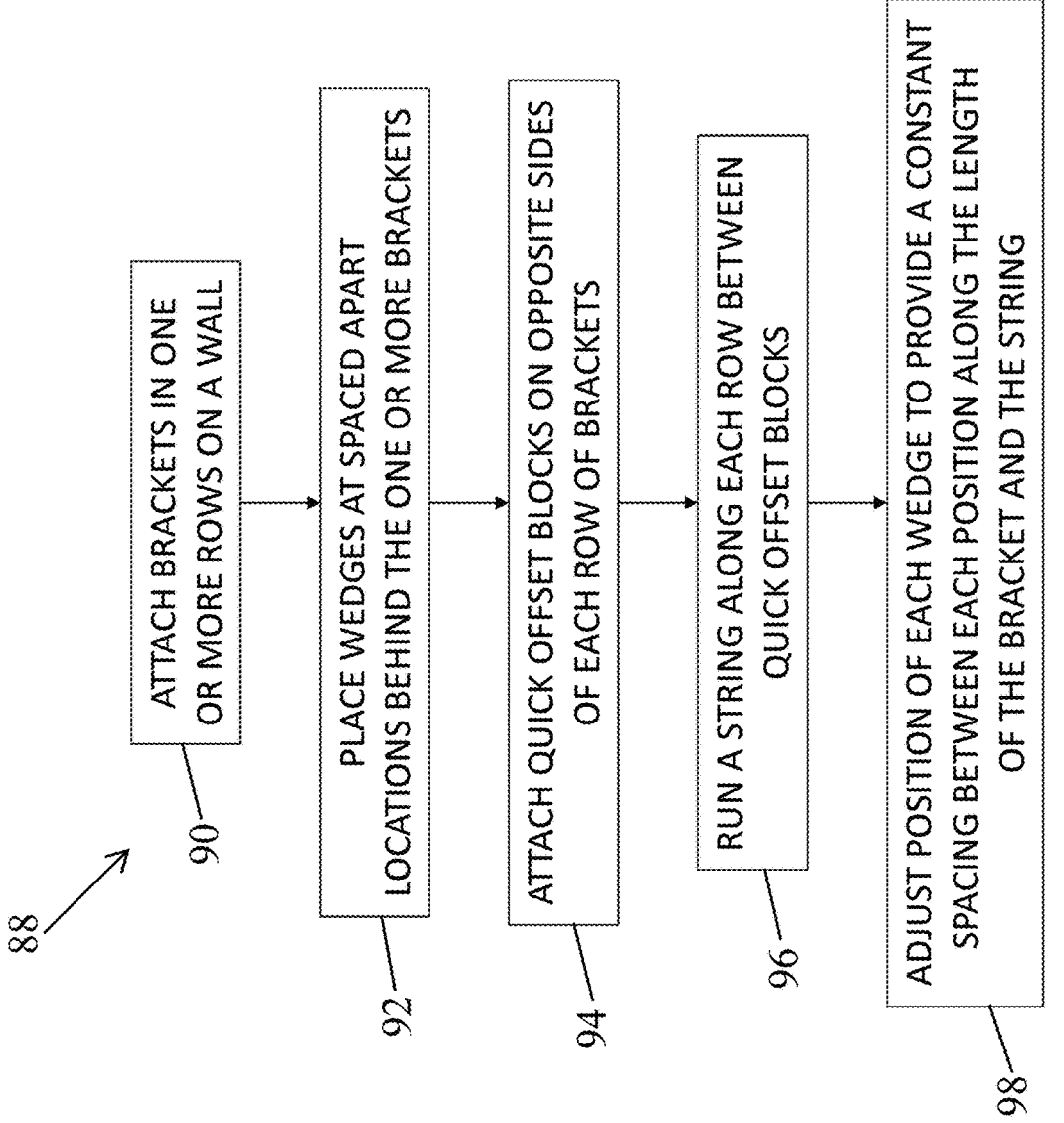
FIG. 16 illustrates an exemplary method of using the bracket of FIG. 1, the wedge of FIG. 2 and the quick offset block of FIG. 14A to mount a bracket on a wall in a single vertical reference plane.

As shown in FIGS. 15 and 16, according to an exemplary method 88 of the present invention, one or more brackets 10 can be placed in one or more rows on the wall (step 90) and wedges 30 can be placed at spaced apart locations behind the bracket 10 (step 92). Typically, the wedges 30 are placed at positions of studs in the wall, but the wedges may be placed at any location behind the brackets 10. Typically, the wedges 30 are spaced apart from 12-16 inches from each other behind the bracket 10. A quick offset block 70 can be positioned at a first end 10A of the bracket 10 and at a second end 10B of the bracket 10 (step 94). A string 82 may be tightly extended between tie arm 74A to tie arm 74B (step 96). The matching offset block 76, which has a thickness 86 that matches the distance 80 (see FIG. 14A), can be positioned against the front side 16 of the bracket, behind the extended string. If the matching offset block 76 moves the string 82 outward, away from the front side 16 of the bracket, then one of the ends 10A, 10B of the bracket 10 needs to be vertically displaced away from the wall 50 via sliding the wedge 30 further under the bracket 10, as discussed above. If there is a gap between the matching offset block 76 and the string 82, then the wedge 30 needs to be slid under the bracket 10 at this location to vertically displace the bracket 10 from the wall 50. The bracket 10 can be aligned in a vertical reference plane when the matching offset block 76 can be positioned along an entirety of the length of the string 82, between the two quick offset blocks 70 at each end 10A, 10B of the bracket 10, without any gap between the string 82 and the matching offset block 76 and without any displacement of the string 82 by the matching offset block 76, as summarized in step 98, which describes adjusting the position of each wedge 30 to provide a constant spacing between the string 82 and the bracket 10.

In some embodiments, in place of the matching offset block 76, multiple ones of the quick offset block 70 may be used along the length of the bracket 10 to ensure vertical reference plane alignment thereof.

When more than one row is present, as shown in FIG. 15, the quick offset blocks 70 in each column (at the first end 10A and the second end 10B of the bracket 10) can first be aligned, then each row can be aligned in the manner discussed above, wherein the string may be run between tie arms 74C and 74D and between tie arms 74E and 74F.

While FIG. 15 illustrates the use of a bracket 10 that extends a length along the wall 50, where this length may be from about 2 feet to about 8 feet or longer, the system and methods discussed above can also be applied to individual brackets placed on a wall. For example, a bracket that is about 2 inches in length may be placed on each stud. The bracket at the first end of the wall and the bracket at the second of the wall may be placed first, and the string 82, described above, may be extended between quick offset blocks 70 placed on these end brackets. The additional brackets may then be placed along the string line, at each stud (or positioned as desired), for example, and the wedges can be used to ensure that each bracket is aligned in a single vertical reference plane.

Referring now to FIGS. 17 through 20, a wedge 30A may be similar to the wedge 30 described above. The wedge 30A can be provided with a back side 32A and a front side 34A, where the front side and back side are angled at an angle 36A to terminate at a tip 31A thereof. In some embodiments, the wedge 30A can include a sloped portion 42A and a non-sloped portion 40A, where the front side 34A and the back side 32A are parallel at the non-sloped portion 40A and are relatively angled at the sloped portion 42A.

Figures 19, 20:
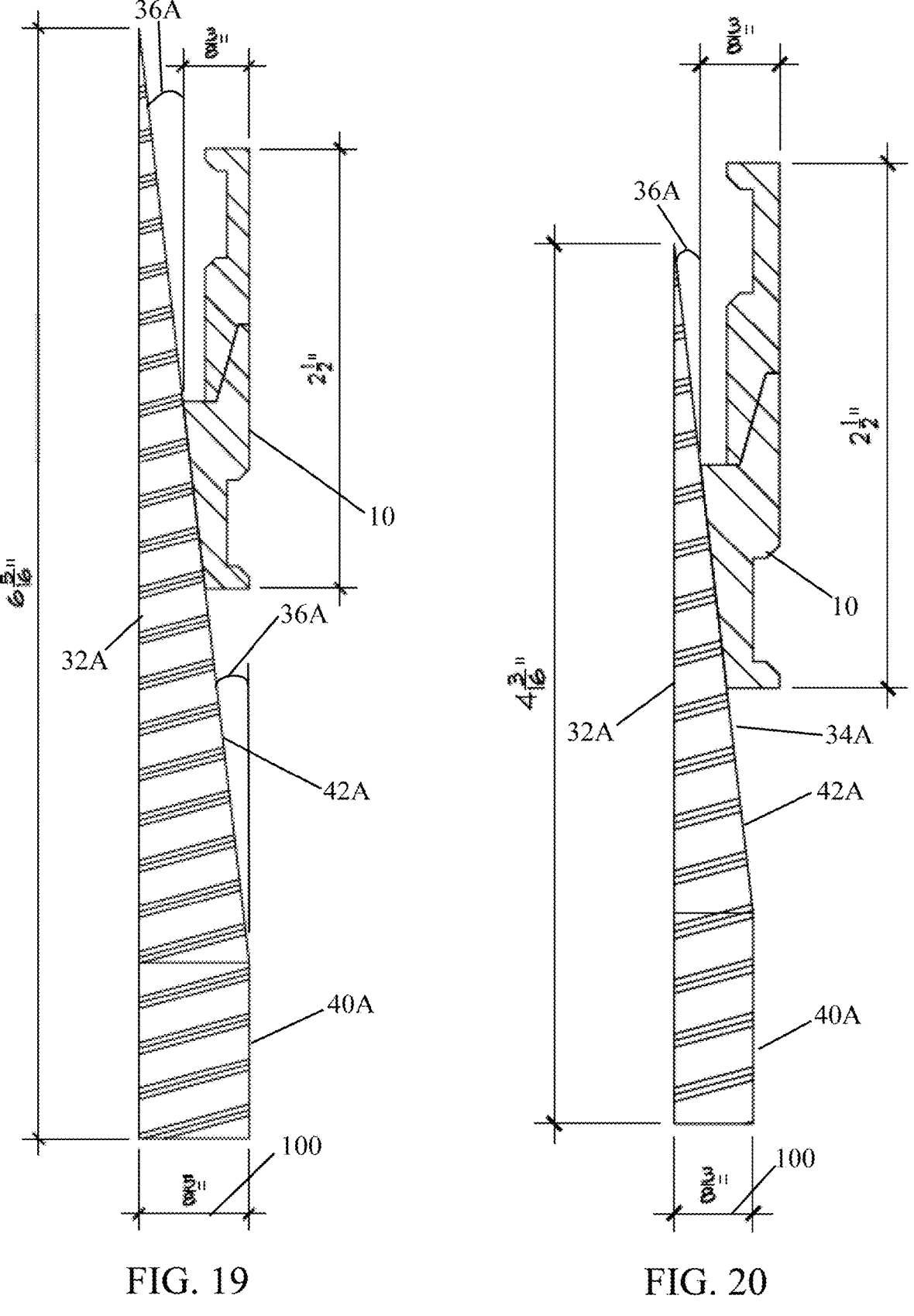
FIG. 19 illustrates a side view of the wedge of FIG. 17.
FIG. 20 illustrates a side view of the wedge of FIG. 18.

The wedge 30A can include a slot 38A formed from the front side 34A to the back side 32A. The slot 38A can extend from the tip 31A and extend along the sloped portion 42A and terminate at or slightly into the non-sloped portion 40A. When the fastener extends through the hole 24 of the bracket 10, the wedge 30A may be slid under the bracket 10, from a bottom side of thereof, with the hole 24 aligning with the slot 38A of the wedge 30A. As shown in FIGS. 19 and 20, when the front side 34A of the wedge is positioned against the back side 14 of the bracket 10, the front side 16 of the bracket 10 may be substantially parallel with the back side 32A of the wedge. When positioned against the wall, the front side 16 of the bracket 10 may be substantially parallel with the wall. Such a feature is due to the angle 36A of the wedge 30A being matched to the angle 22 of the bracket 10. The wedge 30A may be slid an appropriate amount under the bracket 10, as discussed above, to provide a continuously variable amount of displacement of the bracket 10 from the wall. Unlike shims that are provided in different thicknesses, the wedge can provide a continuously variable displacement.

FIGS. 19 and 20 show how the wedge 30A may have an initial thickness 100 at the non-sloped portion 40A that tapers along the sloped portion 42A. FIG. 19 shows an example of an initial thickness 100 of ⅝ inch, while FIG. 20 shows an example of an initial thickness 100 of ⅜ inch. Of course, it should be understood that all measurements shown are for illustrative purposes only and are not meant to limit the dimensions of the wedge 30A according to embodiments of the present invention.

Figure 17:
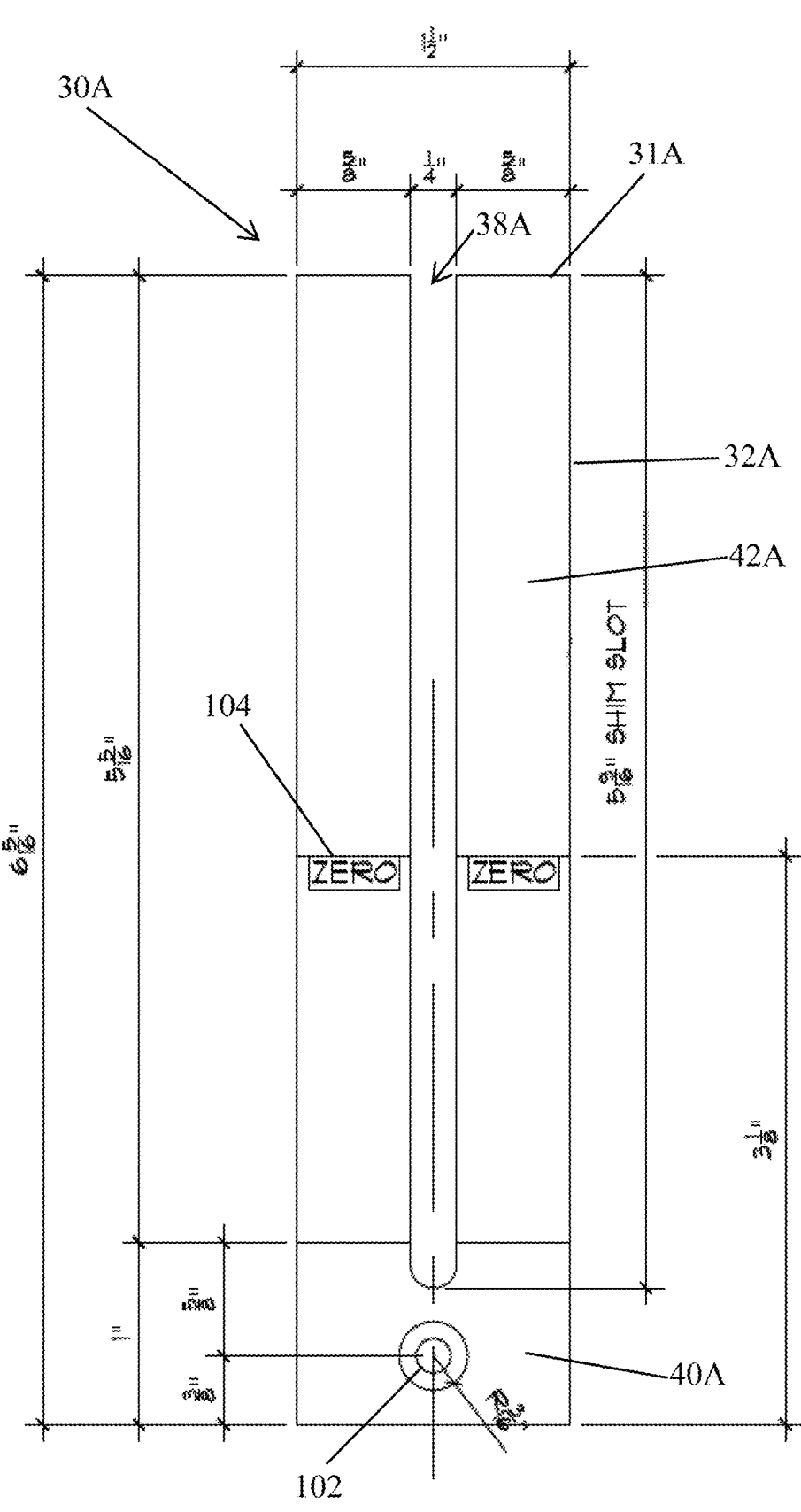
FIG. 17 illustrates a front view of a wedge according to another exemplary embodiment of the present invention.
Figure 18:
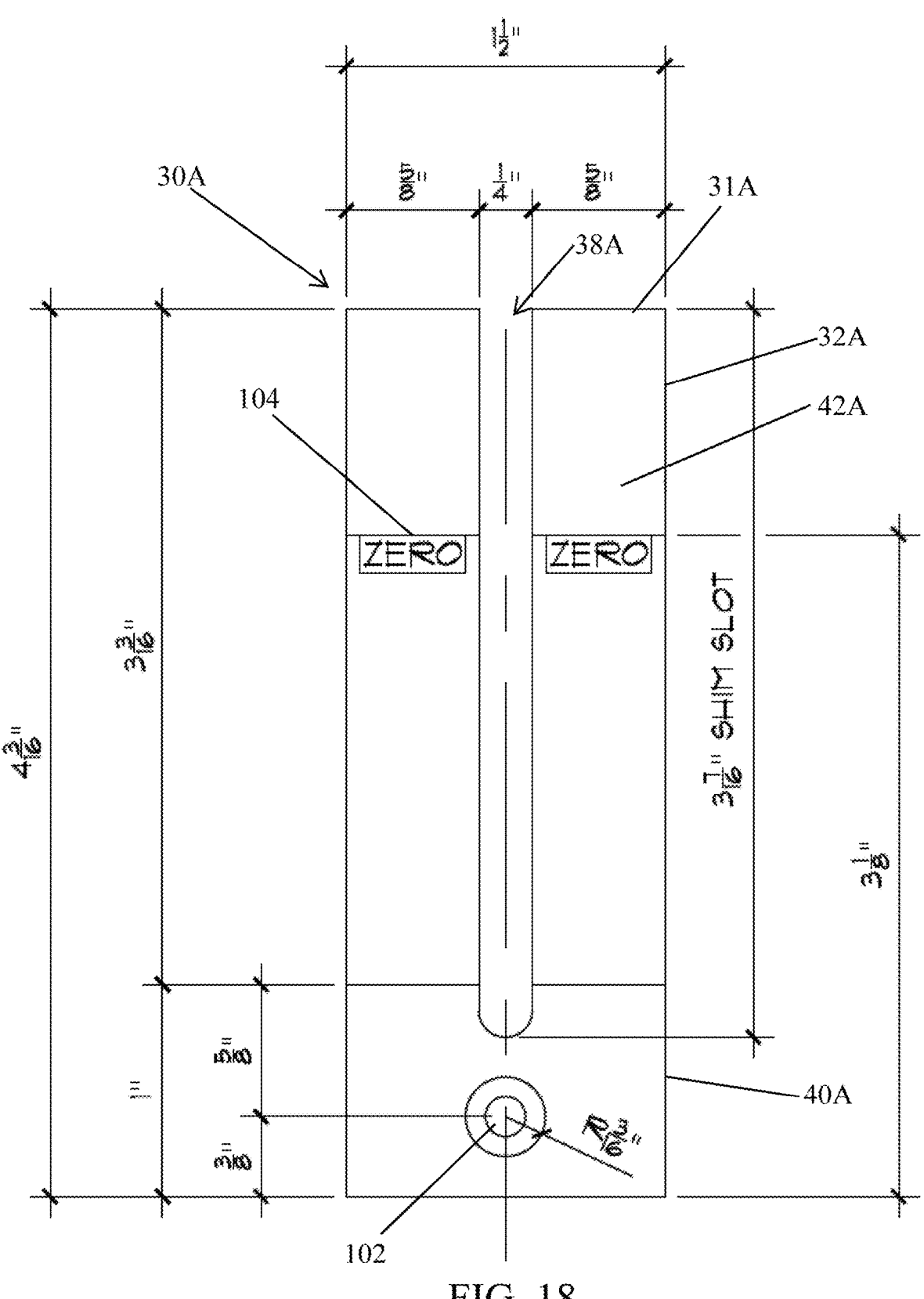
FIG. 18 illustrates a front view of a wedge according to another exemplary embodiment of the present invention.

Further, as shown in FIGS. 17 and 18, the wedge 30A may further include a recessed screw hole 102, permitting attachment of the wedge 30A without requiring the final attachment of the bracket 10 with the screw 54. This allows a user to make the measurements and position the wedges 30A followed by a later placement of the bracket 10 (or the furring strip, as discussed below). Thus, one may position the wedges 30A in a desired location and "fine tune" the vertical displacement position during placement of the bracket 10 (or the furring strip), without having to worry about movement of the wedge 30A.

Further, the wedge 30A can include a zero mark 104. The zero mark 104 defines the minimal position of the bracket 10 (or the furring strip) along the wedge 30A (where the minimal position is defined as the minimal distance of the bracket 10 from the tip 31A of the wedge 30A). Should the back side of the bracket 10 be positioned less than the zero mark 104, the angled back side of the bracket 10 may no longer be positioned against the wedge 30A, and, accordingly, the angle of the bracket 10 may not be at the desired angle. Thus, the zero mark 104 can help ensure proper positioning of the bracket 10 (or the furring strip, as discussed below). The zero mark 104 may be an engraved line, a stamped line, or the like.

Figures 21, 22:
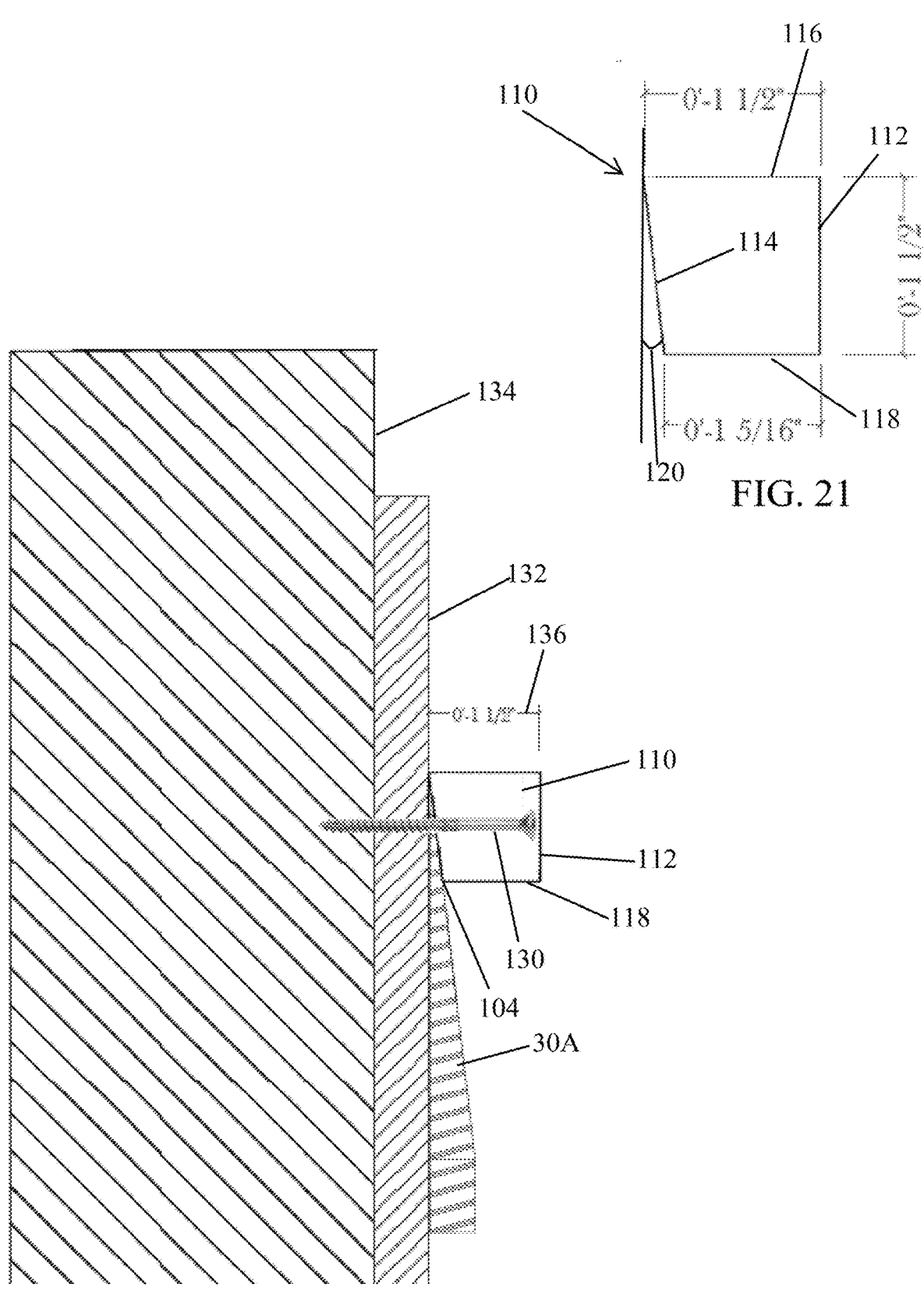
FIG. 21 illustrates a side view of an angled furring strip according to an exemplary embodiment of the present invention.
FIG. 22 illustrates a side cross-sectional view of the wedge of FIG. 17, with the furring strip of FIG. 21 positioned at a minimum vertical offset.

As shown in FIG. 21, a furring strip 110 may be provided having a front face 112 and a back face 114. The front face 112 typically forms a right angle with the top side 116 and the bottom side 118 of the furring strip. The back face 114 may be angled inward (inward defined as being toward the front face 112 as the back face 114 moves downward from the top side 116 to the bottom side 118) at an angle 120. The angle 120 may match the angle 36A of the wedge 30A. The angle 120, based on the dimensions shown in FIG. 21, may be about 7 degrees. It should be understood that, as discussed above with respect to the wedge 30, the angle 120 may also vary, so long as the angle 120 matches the angle 36A of the wedge 30A. It should further be understood that the dimensions shown in FIG. 21 are exemplary for a 2″ dimensional lumber furring strip and may vary depending on the desired dimensions of the furring strip 110.

FIG. 22 shows the furring strip 110 positioned on the wedge 30A at a minimal spacing from the substrate 132. In this position, the zero mark 104 may be aligned with the bottom side 118 of the furring strip. Because the angle 36A of the wedge 30A matches the angle 120 of the furring strip 110, the front face 112 of the furring strip 110 may be parallel to the substrate 132. The position of the furring strip 110 along the wedge 30A can adjust the vertical spacing between the front face 112 of the furring strip 110 and the substrate 32. In the position of FIG. 22 (the minimal spacing position), the front face 112 of the furring strip 110 is positioned 1.5 inches from the substrate 132, which matches the thickness of the furring strip 110 (where the thickness is the distance from the front face 112 to the back face 114 along the top side 116). A screw 130 may be extended through the furring strip 110 at a mounting location 131, through the slot 38A of the wedge 30A, into the substrate 132 and, optionally, into a base material 134, as shown, to secure the furring strip 110 at a desired spacing from the substrate 132. The mounting location 131 may be, for example, centrally located between the top side 116 and the bottom side 118 of the furring strip 110. In some embodiments, the mounting location 131 may be a pre-drilled hole in the furring strip. In other embodiments, the screw 130 may be driven through the furring strip 110 to create the mounting location 131.

Figure 23:
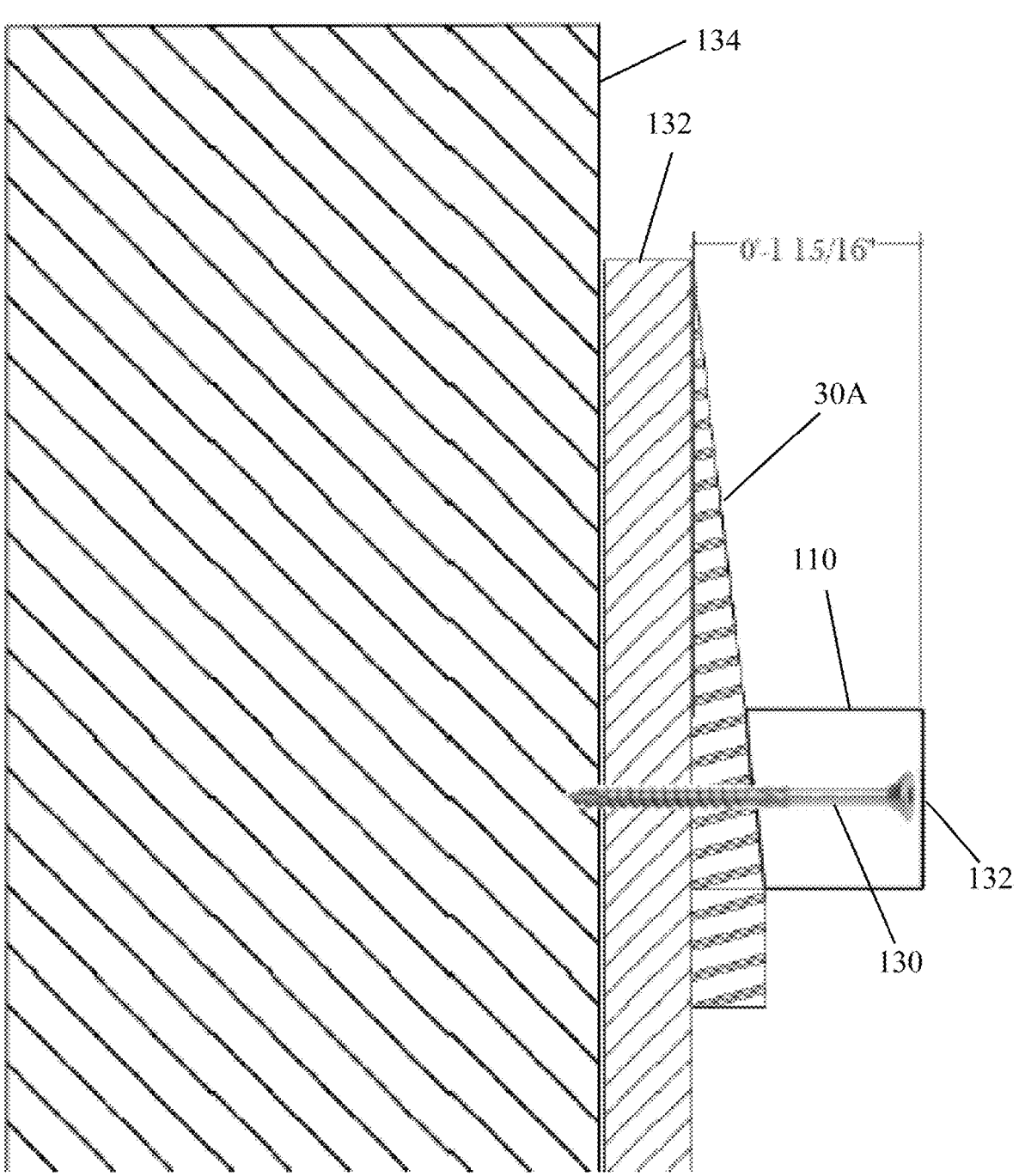
FIG. 23 illustrates a side cross-sectional view of the wedge of FIG. 17, with the furring strip of FIG. 21 positioned at a maximum vertical offset.

FIG. 23 shows the same furring strip 110 and wedge 30A as shown in FIG. 22, except the furring strip 110 is positioned at a maximum spacing from the substrate 132. It should be understood, with the continuous, smooth angled slope of the wedge 30A and of the back face 114 of the furring strip 110, the furring strip 110 can be positioned at any distance from the substrate, between the minimal distance as shown in FIG. 22, to the maximum distance as shown in FIG. 23.

A plurality of wedges 30A may be used to mount multiple ones of the furring strips 110 to create a planar mounting surface. In other words, the wedges 30A can be used to position the front face 112 of the furring strips so that the front face 112 may be planar both along the length of the furring strip 110 (where a wedge 30A may be placed as each location of the substrate 132, or where a plurality of the wedges 30A may otherwise be spaced apart along the length of the furring strip 110), but also between adjacent ones of the furring strips 110, and even among multiple ones of the furring strips 110. Thus, multiple furring strips 110 may be selectively spaced, both along its length and also between two or more furring strips 110, so that the front face 112 of the furring strips 110 are planarly aligned. The length of the furring strip 110 may be defined in a direction into and out of the page with respect to FIGS. 21 through 23.

Figure 24:
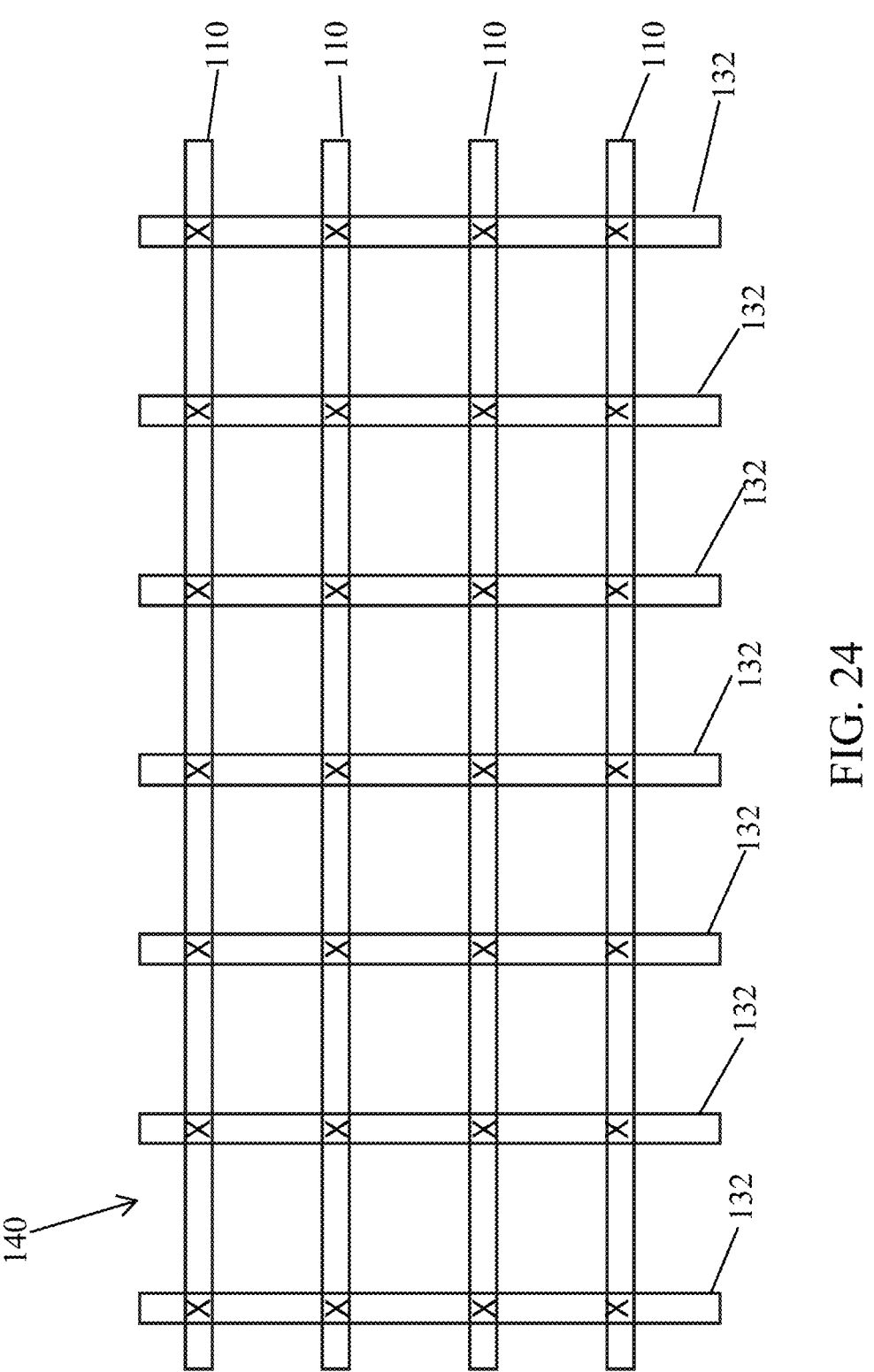
FIG. 24 illustrates an example of a planar mounting surface that can be formed through the angled furring strips and wedges, according to exemplary embodiments of the present invention, being mounted to a substrate

FIG. 24 shows an example of a planar mounting surface 140 that can be formed through the furring strips 110 being mounted to the substrate 130. As discussed above, the wedges 30A may be placed between the furring strips 110 and the substrate 130 to adjust a vertical displacement (that is, out of the page in FIG. 24) of the furring strips 110. The position of the wedges 30A can be adjusted to change the vertical position of the furring strips, where each location (vertical displacement) indicated by "X" may be adjusted so that the "X" positions are all along a given plane, thus forming the planar mounting surface 140. Such a mounting surface may be useful, for example, the placement of cement board for tile mounting, for forming a flat surface for siding mounting, for forming a flat surface for hanging wall coverings, or for any purposes where a planar surface is desirable or required.

While FIG. 24 shows the furring strips 110 positioned horizontally, it should be understood that, depending on the particular application, the furring strips 110 may extend in any direction, including vertically or an any desired angle.

Figure 25:
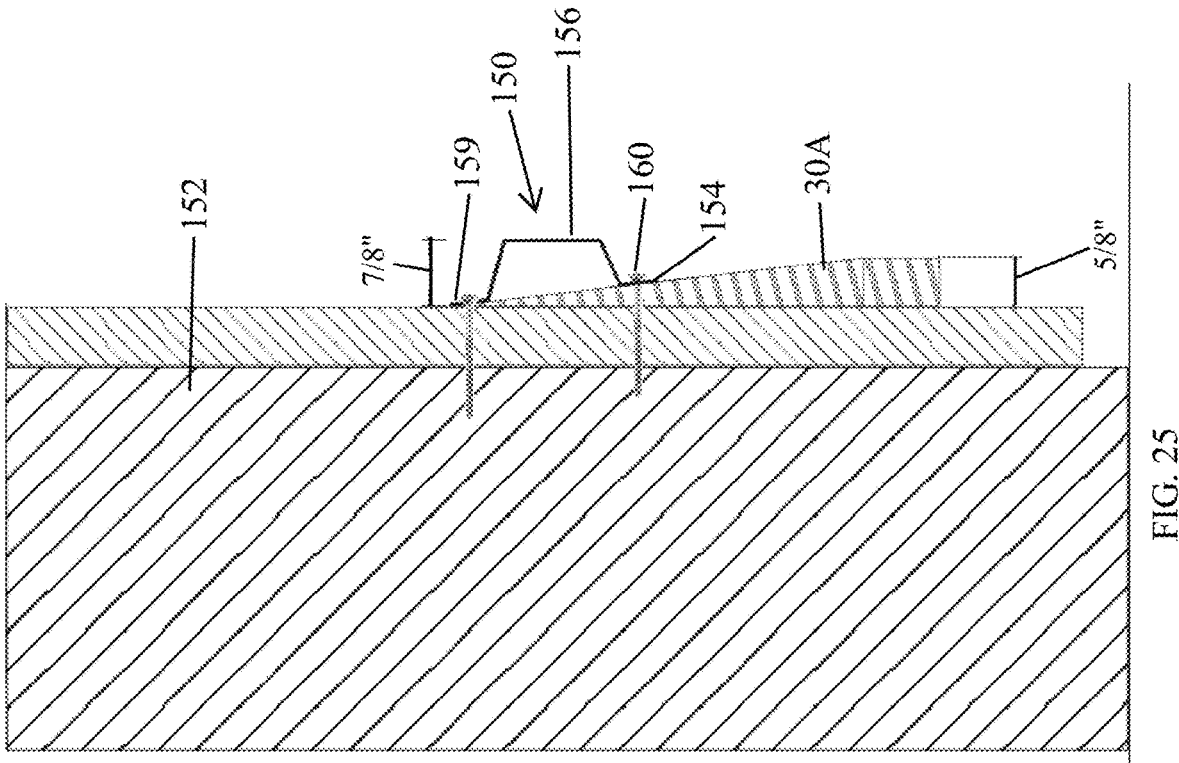
FIG. 25 illustrates a side cross-sectional view of the wedge of FIG. 17, with an angled furring hat channel positioned at a minimum vertical offset.

Referring to FIG. 25, a furring hat channel 150 may have an angled back portion, similar to that described above for the furring strip. In FIG. 25, the furring hat channel 150 is positioned on the wedge 30A at a minimal spacing from the substrate 152. In this position, the zero mark 104 may be aligned with the bottom side 154 of the furring hat channel 150. Because the angle 36A of the wedge 30A (see FIGS. 19 and 20, for example) matches an angle formed from the back side of the furring hat channel 150, the front face 156 of the furring hat channel 150 may be parallel to the substrate 152. The position of the furring hat channel 150 along the wedge 30A can adjust the vertical spacing between the front face 156 of the furring hat channel 150 and the substrate 152. In the position of FIG. 25 (the minimal spacing position), the front face 156 of the furring hat channel 150 is positioned ⅞ inches from the substrate 152, for example. Screws 158 may be extended through the legs 159 of the furring hat channel 150, through the slot 38A (not shown) of the wedge 30A, into the substrate 152, as shown, to secure the furring hat channel 150 at a desired spacing from the substrate 152.

Figure 26:
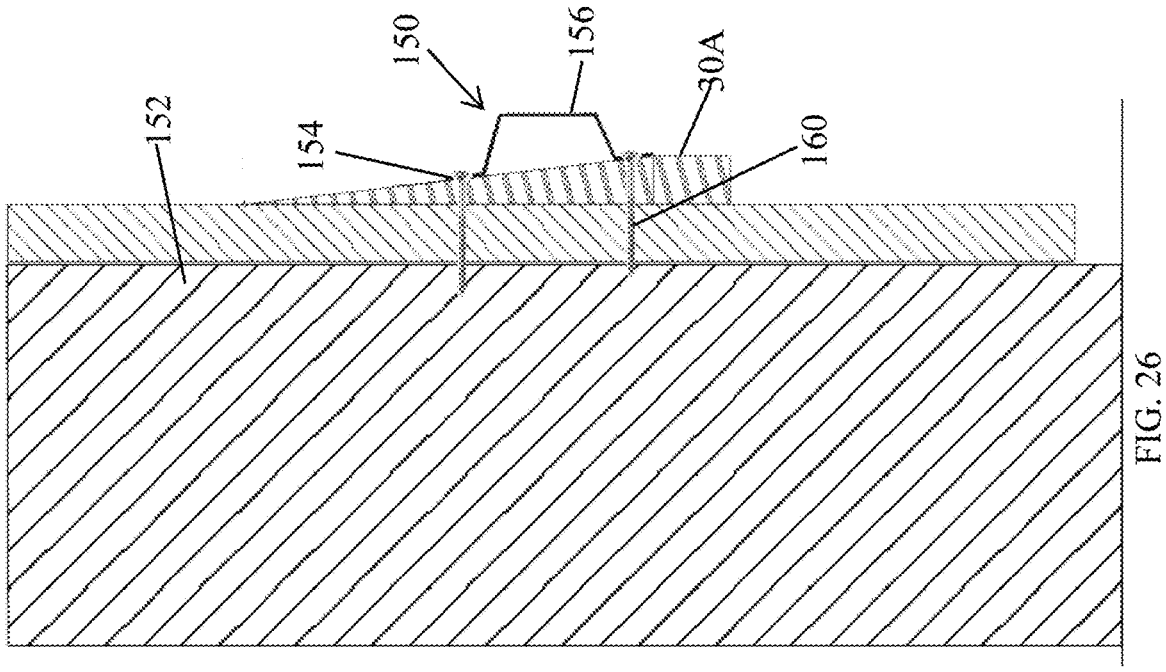
FIG. 26 illustrates a side cross-sectional view of the wedge of FIG. 17, with an angled furring hat channel positioned at a maximum vertical offset.

FIG. 26 shows the same furring hat channel 150 and wedge 30A as shown in FIG. 25, except the furring hat channel 150 is positioned at a maximum spacing from the substrate 152. It should be understood, with the continuous, smooth angled slope of the wedge 30A, the furring hat channel 150 can be positioned at any distance from the substrate 152, between the minimal distance as shown in FIG. 25, to the maximum distance as shown in FIG. 26. Of course, the distances shown in FIGS. 25 and 26 are exemplary and may vary depending on the overall thickness of the wedge 30A.

Figure 27:
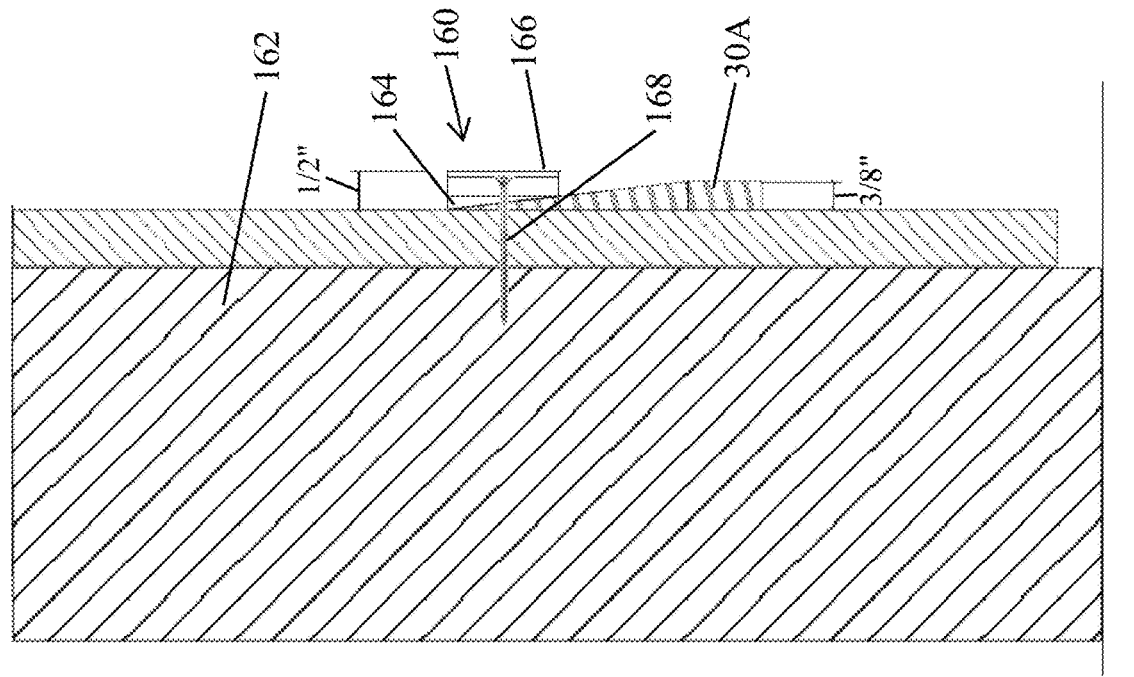
FIG. 27 illustrates a side cross-sectional view of the wedge of FIG. 17, with an angled rain screen furring positioned at a minimum vertical offset.

Referring to FIG. 27, a rain screen furring 160 may have an angled back portion, similar to that described above for the furring strip. In FIG. 27, the rain screen furring 160 is positioned on the wedge 30A at a minimal spacing from the substrate 162. In this position, the zero mark 104 may be aligned with the bottom side 164 of the rain screen furring 160. Because the angle 36A of the wedge 30A (see FIGS. 19 and 20, for example) matches an angle formed from the back side of the rain screen furring 160, the front face 166 of the rain screen furring 160 may be parallel to the substrate 162. The position of the rain screen furring 160 along the wedge 30A can adjust the vertical spacing between the front face 166 of the rain screen furring 160 and the substrate 162. In the position of FIG. 27 (the minimal spacing position), the front face 166 of the rain screen furring 160 is positioned ½ inches from the substrate 162, for example. A screw 168 may be extended through the rain screen furring 160, through the slot 38A (not shown) of the wedge 30A, into the substrate 162, as shown, to secure the rain screen furring 160 at a desired spacing from the substrate 162.

Figure 28:
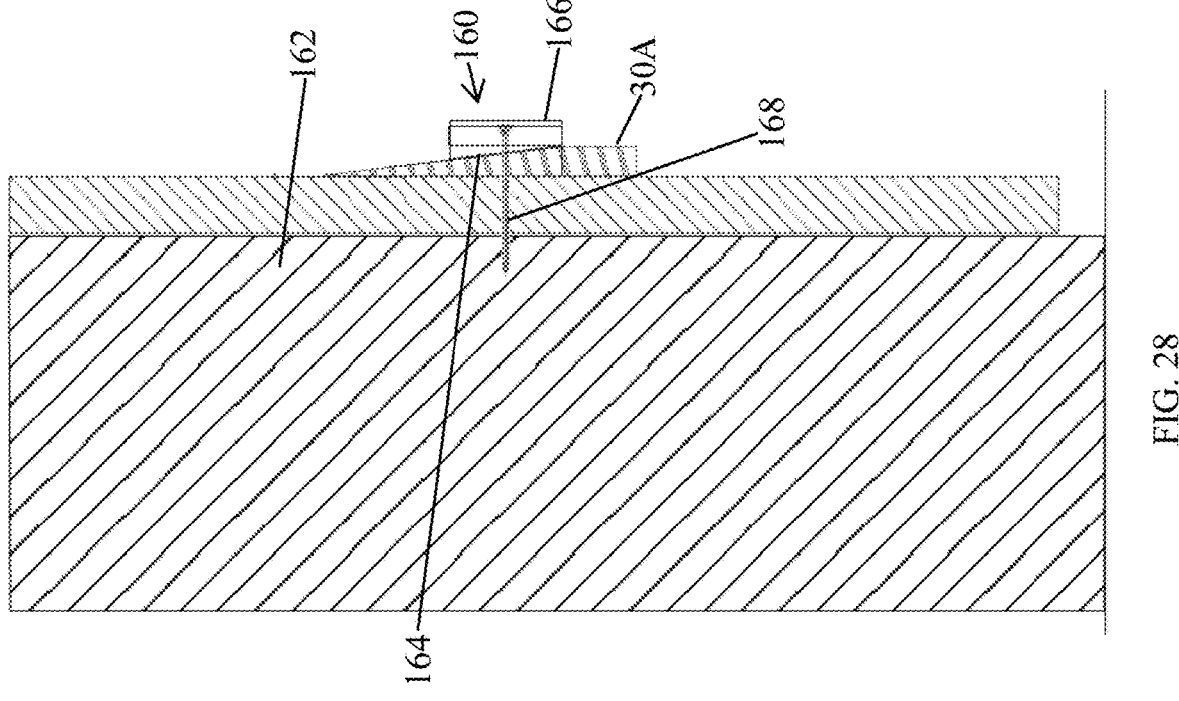
FIG. 28 illustrates a side cross-sectional view of the wedge of FIG. 17, with an angled rain screen furring positioned at a maximum vertical offset.

FIG. 28 shows the same rain screen furring 160 and wedge 30A as shown in FIG. 27, except the rain screen furring 160 is positioned at a maximum spacing from the substrate 162. It should be understood, with the continuous, smooth angled slope of the wedge 30A, the rain screen furring 160 can be positioned at any distance from the substrate 162, between the minimal distance as shown in FIG. 27, to the maximum distance as shown in FIG. 28. Of course, the distances shown in FIGS. 27 and 28 are exemplary and may vary depending on the overall thickness of the wedge 30A.

While FIGS. 25 through 28 show examples of elements that can be adjusted in their vertical offsets, as discussed above, it should be understood that the system of the present invention may be usable on any element that may be formed with an angled back member to permit vertical offset adjustments by moving the back member along an angled wedge. Thus, as used herein, the term "element" may be used to describe a furring strip, a furring hat channel, a rain screen furring, or any other profile where it may be desirable to provide a means for adjusting its vertical distance from a substrate.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A system for creating a planar mounting surface, comprising:

an element spanning a length, where the element has a front face, a back face, a top side and a bottom side, the back face forming a first angle with respect to the top side, the front face forming a second angle with respect to the top side, and a difference of the first angle and the second angle defining an element back face angle; and a wedge having a wedge back side configured to be positioned against a substrate, with at least a portion of the wedge back side being disposed between the back face of the element and the substrate; and a wedge front side configured to be slidable along the back face of the element, wherein the wedge back side and the wedge front side form a wedge angle to provide a continuously increasing thickness along a length of the wedge, from a tip end toward a distal end thereof;

the length of the element is greater than a width of the wedge;

the wedge angle is equal to the element back face angle; and the wedge includes a non-sloped portion, at the distal end thereof, where, at the non-sloped portion, the wedge back side is parallel to the wedge front side and a back side of the non-sloped portion is continuous and linear with the wedge back side.

2. The system of claim 1, wherein the element is a furring strip.

3. The system of claim 1, wherein the back face is continuous and linear about an entirety of the back face.

4. The system of claim 1, wherein the element back face angle is from about 4 degrees to about 10 degrees.

5. The system of claim 1, further comprising a through hole formed through the non-sloped portion.

6. The system of claim 1, wherein the wedge further includes a slot extending along a portion of the length of the wedge, from the tip end and ending at or into the non-sloped portion, the slot extending through the wedge, from the wedge back side to the wedge front side.

7. The system of claim 1, wherein the wedge further includes a slot extending along a portion of the length of the wedge, from the tip end thereof, the slot extending through the wedge, from the wedge back side to the wedge front side.

8. The system of claim 7, wherein the slot aligns with a mounting location in the furring strip.

9. The system of claim 1, wherein the front face is parallel to the substrate when the wedge is positioned between the substrate and the element.

10. The system of claim 1, further comprising a zero mark on the wedge front side, the zero mark positioned at a distance from the tip end that is equal to a length of the back face of the element.

11. A system for creating a planar mounting surface, comprising:

a furring strip spanning a length, where the furring strip has a front face, a back face, a top side and a bottom side, the back face forming a first angle with respect to the top side, the front face forming a second angle with respect to the top side, and a difference of the first angle and the second angle defining a furring strip back face angle; and a wedge having a wedge back side configured to be positioned against a substrate, with at least a portion of the wedge back side being disposed between the back face of the furring strip and the substrate; and a wedge front side configured to be slidable along the back face of the furring strip, wherein:

the length of the furring strip is greater than a width of the wedge;

the wedge back side and the wedge front side form a wedge angle to provide a continuously increasing thickness along a length of the wedge, from a tip end toward a distal end thereof;

the back face is continuous and linear about an entirety of the back side; and the wedge angle matches the furring strip back face angle.

12. The system of claim 11, wherein the furring strip back face angle is from about 4 degrees to about 10 degrees.

13. The system of claim 11, wherein the wedge further includes a non-sloped portion, at the distal end thereof, where, at the non-sloped portion, the wedge back side is parallel to the wedge front side.

14. The system of claim 13, further comprising a through hole formed through the non-sloped portion.

15. The system of claim 11, wherein the wedge further includes a slot extending along a portion of the length of the wedge, from the tip end thereof, the slot extending through the wedge, from the wedge back side to the wedge front side.

16. The system of claim 11, further comprising a zero mark on the wedge front side, the zero mark positioned at a distance from the tip end that is equal to a length of the back face of the furring strip.

17. A method for creating a planar mounting surface, comprising:

disposing a furring strip, spanning a length, on a substrate, where the furring strip has a front face, a back face, a top side and a bottom side, the back face forming a first angle with respect to the top side, the front face forming a second angle with respect to the top side, and a difference of the first angle and the second angle defining a furring strip back face angle;

disposing a portion of a wedge between the furring strip and the substrate, the wedge having a wedge back side positioned against the substrate, the wedge having a wedge front side slidable along the back face of the furring strip to adjust a vertical displacement of the furring strip from the substrate, wherein the wedge back side and the wedge front side form a wedge angle to provide a continuously increasing thickness along a length of the wedge, from a tip end toward a distal end thereof; and adjusting a position of the wedge to align the furring strip to create the planar mounting surface at the front face of the furring strip, wherein:

the wedge includes a plurality of wedges disposed along a length of the furring strip; and the furring strip includes two or more furring strips, and the method further includes adjusting the position of the plurality of wedges along each of the two or more furring strips to create the planar mounting surface both along a length of the furring strip and between each of the two or more furring strips.

* * * * *